United States Patent [19]

Corley et al.

[11] Patent Number: 5,157,105
[45] Date of Patent: Oct. 20, 1992

[54] BISBENZOCYCLOBUTENE/BISIMIDE/-DICYANATE ESTER COMPOSITION

[75] Inventors: Larry S. Corley; Pui K. Wong, both of Houston, Tex.

[73] Assignee: Shell Oil Company, Houston, Tex.

[21] Appl. No.: 701,735

[22] Filed: May 17, 1991

[51] Int. Cl.$^5$ .............................................. C08G 73/12
[52] U.S. Cl. .................................. 528/322; 528/125; 528/128; 528/170; 528/321
[58] Field of Search ............... 528/322, 321, 125, 128, 528/170

[56] References Cited

U.S. PATENT DOCUMENTS

| 4,110,364 | 8/1978 | Gaku et al. | 528/170 |
| 4,730,030 | 3/1988 | Hahn et al. | 526/262 |
| 4,749,760 | 6/1988 | Wang | 525/471 |
| 4,927,907 | 5/1990 | Corley | 528/322 |

Primary Examiner—Harold D. Anderson

[57] ABSTRACT

A curable composition containing a dicyanate ester, a bisimide and a bisbenzocyclobutene provides a processable cyanate ester which has improved toughness in the cured state.

8 Claims, No Drawings

BISBENZOCYCLOBUTENE/BISIMIDE/DICYANATE ESTER COMPOSITION

BACKGROUND OF THE INVENTION

This invention relates to thermosettable resin compositions and their preparation. In a specific embodiment, the invention relates to cyanate ester resins having improved toughness and processable melt viscosity.

Advanced composites are high-performance materials made up of a fiber-reinforced thermoplastic or thermosettable polymer. Thermosettable polymers useful in advanced composites applications must meet a set of demanding requirements, including good high-temperature properties, such as high (above 200° C.) cured glass transition temperature, and good mechanical strength. For ease of processing in preparing prepregs for composite parts, the uncured material ideally has a low (below 120° C.) melting temperature and low viscosity in the melt.

Cyanate ester resins have low melt viscosity and good high-temperature properties, but cyanate ester homopolymers are quite brittle. Addition of thermoplastics or cyanate-terminated oligomers increases the toughness but produces uncured mixtures so high in viscosity that fiber impregnation and processing by standard thermoset techniques are difficult.

It is therefore an object of the invention to provide cyanate ester resins which have low uncured melt viscosity and improved toughness in the cured state.

BRIEF SUMMARY OF THE INVENTION

According to the invention, a composition is provided comprising a dicyanate ester, a bisimide and a bisbenzocyclobutene. Such a composition exhibits low melt viscosity and, when cured to co-crosslink the monomers, provides a thermoset cyanate ester having enhanced toughness.

DETAILED DESCRIPTION OF THE INVENTION

The invention composition includes a dicyanate ester which can be represented by the general formula

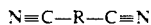  (1)

in which R is an aromatic group-containing divalent linking moiety. The aromatic group(s) can include substituted and unsubstituted benzene, naphthalene, anthracene and fluorene-derived chemical moieties. Preferred cyanate esters can be represented by the formula

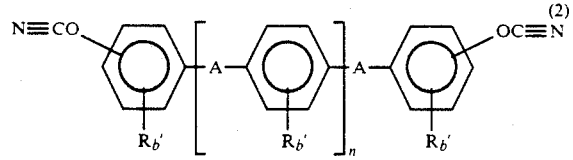  (2)

in which each $R'$ is independently selected from $C_{1-6}$ alkyl, allyl, alkoxy and halide; A is a divalent linking group; n is within the range of 0 to about 8, preferably 0 to 3; and b is 0, 1, 2 or 3. Examples of suitable A include a direct bond, $C_{1-10}$ hydrocarbon, dicyclopentadienyl, O, $SO_2$, $CO_2$, CONH, CO and S, preferably methylene and 2,2-propylidene.

Such cyanate esters can be prepared by the base-catalyzed reaction of a diphenolic compound and a cyanogen halide. Suitable starting phenolic reactants include, for example, dihydroxybiphenyls such as 4,4'-dihydroxybiphenyl, 2,2'-dihydroxybiphenyl, 3,3',5,5'-tetramethyl-4,4'-dihydroxybiphenyl, 3,3',5,5'-tetrachloro-4,4'-dihydroxybiphenyl, 3,3',5,5'-tetrachloro-2,2'-dihydroxybiphenyl, 2,2',6,6'-tetrachloro-4,4'-dihydroxybiphenyl, 4,4'-bis(3-hydroxyphenoxy)biphenyl, 4,4'-bis(4-hydroxyphenoxy)biphenyl; 2,2'-dihydroxy-1,1'-binaphthyl; dihydroxy diphenyl ethers such as, for example, 4,4'-dihydroxydiphenyl ether, 3,3'-5,5'-tetramethyl-4,4'-dihydroxydiphenyl ether, 3,3',5,5'-tetrachloro-4,4'-dihydroxydiphenyl ether, 4,4'-bis(p-hydroxyphenoxy)-diphenyl ether, 4,4'-bis(p-hydroxyphenyl isopropyl)-diphenyl ether, 4,4'-bis[p-hydroxyphenoxy]-benzene, 4,4'-bis(m-hydroxyphenoxy)diphenyl ether, 4,4'-bis[4-hydroxyphenoxy)phenylsulphonyl]diphenyl ether; diphenyl sulphones such as, for example, 4,4'-dihydroxydiphenyl sulphone, 3,3',5,5'-tetramethyl-4,4'-dihydroxydiphenyl sulphone, 3,3',5,5'-tetrachloro-4,4'-dihydroxydiphenyl sulphone, 4,4'-bis(p-hydroxyphenyl isopropyl)diphenyl sulphone, 4,4'-bis(4-hydroxyphenoxy)-diphenyl sulphone, 4,4'-bis(3-hydroxyphenoxy)diphenyl sulphone, 4,4'-bis[4(4-hydroxyphenyl isopropyl)-phenoxy]diphenyl sulphone, 4,4'-bis[4-(4-hydroxyphenylsulphonyl)phenoxy]diphenyl sulphone, 4,4'-bis[4-(4-hydroxy)diphenoxy]diphenyl sulphone; dihydroxy diphenyl alkanes such as, for example, 4,4'-dihydroxydiphenylmethane, 4,4'-bis(p-hydroxyphenyl)diphenylmethane, 2,2-bis(p-hydroxyphenyl) propane, 2,2-bis(3,5-dimethyl-4-hydroxyphenyl)propane, 2,2-bis(3,5-dichloro-4-hydroxyphenyl)propane, 1,1-bis(p-hydroxyphenyl)cyclohexane, bis[2-hydroxy-1-naphthyl]methane, 1,2-bis(p-hydroxyphenyl)-1,1,2,2-tetramethyl ethane, 4,4'-dihydroxybenzophenone, 4,4'-bis(4-hydroxyphenoxy) benzophenone and 1,4-bis(p-hydroxyphenyl isopropyl)benzene.

Phenolic reactants can also include phenolic novolacs, such as BPA novolac and o-cresol novolac, for example. The phenolic novolac may contain substituents as described above, including glycidyl ether, propargyl ether and $C_{1-6}$ alkyl groups.

The reaction of the cyanogen halide with the phenol is catalyzed by a base. The base can be, for example, an alkali metal hydroxide such as sodium hydroxide or potassium hydroxide; an alkali metal alkoxide such as sodium methoxide or potassium ethoxide; and various amines, preferably tertiary amines such as triethyl amine.

The invention composition includes a bisimide of an unsaturated dicarboxylic acid. The preferred bisimides are N,N'-bisimides of unsaturated dicarboxylic acids which can be represented by the formula

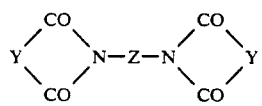

in which Y is a substituted or unsubstituted divalent radical containing at least 2 carbon atoms, preferably 2 to 6 carbon atoms, and a carbon-carbon double bond, and Z is a divalent radical containing at least 1 and generally about 1 to 40, carbon atoms. Z can be aliphatic, cycloaliphatic, aromatic or heterocyclic. A preferred class of bisimides comprises bismaleimides derived from aromatic amines and can be represented by the formula

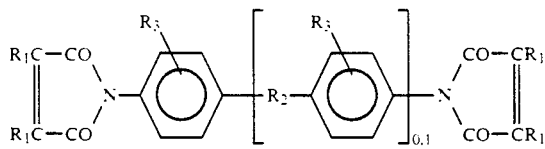

in which each $R_1$ is selected independently from H, $C_{1-2}$ alkyl or halide; $R_2$ is selected from divalent hydrocarbon radicals containing from about 1 to about 10 carbon atoms, —O—, —SO$_2$—, —COO—, —CONH—, —CO— and —S—; and each $R_3$ is selected independently from H, $C_{1-3}$ alkyl and halide.

Examples of such bisimides include
1,2-bismaleimidoethane
1,6-bismaleimidohexane
1,3-bismaleimidobenzene
1,4-bismaleimidobenzene
2,4-bismaleimidotoluene
4,4'-bismaleimidodiphenylmethane
4,4'-bismaleimidodiphenyl ether
3,3'-bismaleimidodiphenyl sulfone
4,4'-bismaleimidodiphenyl sulfone
4,4'-bismaleimidodicyclohexylmethane
3,5-bis(4-maleimidophenyl)pyridine
2,6-bismaleimidopyridine
1,3-bis(maleimidomethyl)cyclohexane
1,3-bis(maleimidomethyl)benzene
1,1-bis(4-maleimidophenyl)cyclohexane
1,3-bis(dichloromaleimido)benzene
4,4'-biscitraconimidodiphenylmethane
2,2-bis(4-maleimidophenyl)propane
1-phenyl-1,1-bis(4-maleimidophenyl)ethane
α,α-bis(4-maleimidophenyl)toluene
3,5-bismaleimido-1,2,4-triazole and various N,N'-bismaleimides disclosed in U.S. Pat. Nos. 3,562,223, 4,211,860 and 4,211,861. Bismaleimides can be prepared by methods known in the art, as described in U.S. Pat. No. 3,018,290, for example.

The bismaleimide resin can contain imide oligomer according to the formula

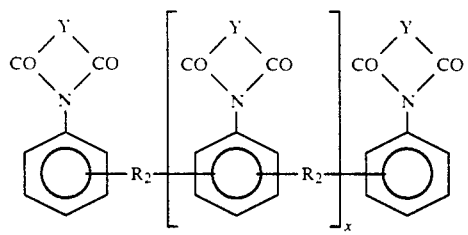

in which x is a number within the range of about 0 to about 0.5. Such oligomers may be present as an impurity in difunctional bisimides.

The preferred bisimide resin is N,N'-4,4'-diphenylmethane bismaleimide. The bisimide can contain various additives and modifiers as processing aids. The bisimide resin component can be a reaction product or prepolymer of a bisimide and an effective chain-extending agent such as an amine group-containing compound. Suitable amine group-containing compounds include diamines and polyamines represented by the general formula $(H_2N)_nQ$ and aminophenols represented by the general formula $(NH_2)_nQ(OH)_n$, in which Q is a divalent aromatic or alicyclic group and n is a number from 1 to about 4. Examples include bis(4-(N-methylamino)-phenyl)methane, 1,3-diaminobenzene and the like. Such reaction products can be prepared by methods known in the art, such as contacting about 0.5 to about 1.2 mole of the chain-extending agent per mole of the bisimide in an organic solvent at a temperature of about 40° to 250° for a time of about 5 minutes to 5 hours. The bisimide can be, for example, a hydrazide-modified bismaleimide as described in U.S. Pat. Nos. 4,211,860 and 4,211,861. Suitable N,N'-unsaturated bismaleimide resins are commercially available from Technochemie GmbH as Compimide ® resins, for example. The bisimide can be a mixture of bisimides described above tailored to meet specific processing requirements.

The invention composition includes a bisbenzocyclobutene which can be described by the following formula

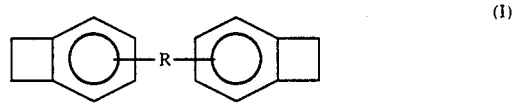

(I)

in which R can be selected from a wide range of organic and inorganic moieties including, for example, alkyl, cycloalkyl, aryl and heterocyclic. In a preferred embodiment, the bisbenzocyclobutene can be described according to one of formulas I, II or III

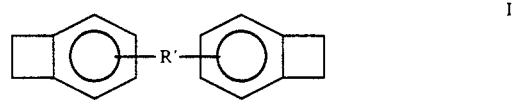

I

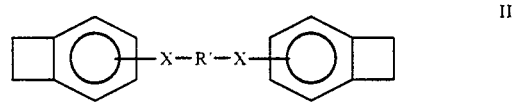

II

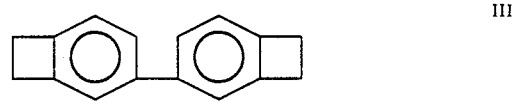

III in which R' is selected from unsubstituted or non-electrophilic substituted phenylene, naphthalenediyl, and

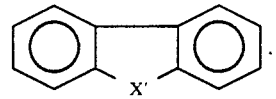

.

where X is selected from oxygen, sulfur, nitrogen, —CH$_2$— and —C(CH$_3$)$_2$—, and X' is selected from O, S, N and —CH$_2$—. Examples of R' include o-, m- and p-phenylene, 2,7-naphthalenediyl and dibenzofurandiyl. The presently-preferred bisbenzocyclobutene, because of the superior properties of the copolymer, can be defined by formula I above when R is 1,3-phenylene.

The preparation of bisbenzocyclobutene monomers is known generally in the art, for example, U.S. Pat. Nos. 4,540,763 and U.S. 4,711,964, the methods of which can be adapted for certain of the bisbenzocyclobutene monomers of the present invention compositions. Preparation of diaryl ethers of bisphenols is described in Williams, Kenney and Bridger, *J. Org. Chem.*, 32, 2501-2502 (1967). Specifically, bis(benzocyclobutenyl)ethers of bisphenols can be synthesized by the Ullmann etherification of 4-bromobenzocyclobutene with a suspension of the disodium salt of a bisphenol such as resorcinol in refluxing pyridine (or an alkylpyridine) containing dissolved CuCl as a catalyst. The disodium salt of resorcinol is suitably prepared by the reaction of resorcinol with sodium methoxide in pyridine with the methanol removed as an azeotrope with pyridine. Similarly, arylene-bridged bisbenzocyclobutenes can be prepared by the reaction of benzocyclobutenyl Grignard reagent with dihaloarenes in the presence of various nickel or palladium compounds. This type of reaction is described in Kumada, *Pure Appl. Chem.*, 52, 669-679 (1980). Benzocyclobutenyl Grignard reagent may in turn be prepared by the reaction of 4-bromobenzocyclobutene with magnesium in tetrahydrofuran.

Preparation of Cyanate Ester/Bisbenzocyclobutene/Bisimide Copolymers

The cyanate ester, bisimide and bisbenzocyclobutene monomers may be combined in any manner desired, such as melt, solution or powder blending. The preferred technique involves melting a mixture of the solid monomers containing the desired quantities of each monomer at a temperature above the respective melting points but below the polymerization temperature of any monomer, and stirring the melt until a homogeneous mixture is achieved. The melt may also be held at temperatures above about 200° C. for desired periods of time in a process of prepolymerization to increase the crystallization resistance of the melt and/or to increase its viscosity to desired levels. The mixture can then be poured directly into a mold for polymerization, or it can be cooled for later polymerization. For optimum properties of the blend, the molar ratio of BCB:BMI will generally fall within the range of about 0.5:1 to about 2:1, preferably about 0.8:1 to about 1.2:1, and the molar ratio of cyanate ester to BMI will generally fall within the range of about 0.1:1 to about 10:1, preferably about 0.5:1 to about 5:1.

The composition may contain an optional free radical inhibitor to inhibit free radical polymerization of the bisimide monomer. Generally, the free radical inhibitor will be present in the composition in an amount within the range of about 0.0002 to about 0.02 moles per mole of the bisimide, preferably from about 0.001 to about 0.01 moles. The free radical inhibitor can be added to the monomers in any manner effective for intimate blending of the monomers and free radical inhibitor. Free radical inhibitors include phenols such as t-butylcatechol, hydroquinone and p-methoxyphenol; quinones such as 1,4-benzoquinone and 1,4-naphthoquinone; polynitro aromatics such as picric acid and 2,4,6-trinitrotoluene; hydroxylamines such as diethylhydroxylamine; stable radicals such as di-t-butylnitroxide or diphenylpicrylhydrazyl; and certain polycyclic heterocycles such as phenothiazine. The preferred free radical inhibitor is phenothiazine.

Polymerization is effected by heating the mixture to a temperature effective to initiate opening of the benzocyclobutene rings to form a transient diene which rapidly reacts with available maleimide groups. The temperature is generally at least about 180° C., preferably about 210° to about 350° C., held for a time of about 2 hours or more (with the required cure time dependent on the temperature-staging program used). In order to achieve optimum properties in the copolymers, a mixture of the monomers and free radical inhibitor is heated at a temperature near or above the ultimate (fully cured) glass transition temperature of the copolymer composition for a time sufficient to produce essentially complete reaction of the monomers. "Essentially complete" reaction of the monomers has been reached when no further reaction exotherm is observed by differential scanning calorimetry (DSC) upon heating of the copolymer. The time of the heat treatment, or "post-cure," will vary depending upon the monomers, the degree of pressure applied and any precuring of the monomer mixture.

The copolymers are useful as resin matrices for composites in aerospace and electronics applications, including large structural parts and circuit boards. Based on their long shelf life and relatively low melting point, some of the uncured mixtures are useful for making tacky prepregs which can then be molded into composites. They are also suitable for liquid resin processing methods such as filament winding, resin transfer molding, resin infusion molding, and pultrusion if the mixtures are heated to provide sufficiently low viscosity for fiber impregnation. The cured polymers are also suitable for electrical applications such as the manufacture of circuit boards.

For preparation of reinforced laminate materials, a fibrous substrate of glass, carbon, quartz, poly(p-phenyleneterephthalamide), polyester, polytetrafluoroethylene, poly(p-phenylenebenzobisthiazole), boron, paper or like material, in chopped, mat or woven form, is impregnated with a mixed monomer composition in molten or solution form. A prepreg is formed by heating the impregnated substrate in an oven at a temperature sufficient to remove the solvent and to partially cure without gelation, or "B-stage," the resin system, generally about 180° C. to about 230° C., preferably about 200° to about 220° C., for a time of up to about 2 hours, preferably about 10 to about 40 minutes. A laminate is fabricated by subjecting a set of layered prepregs to conditions effective to cure the resins and to integrate the prepregs into a laminated structure. The laminate can optionally include one or more layers of a conductive material such as copper.

Laminating generally involves subjecting the prepregs to a temperature above about 200° C., preferably from about 210° to about 350° C., for a time of at least about 1 hour, at a pressure within the range of about 50 to about 500 psi.

For some laminating applications, especially if the monomeric mixture will be dissolved in a solvent before impregnation of the substrate, it may be advantageous to heat treat, or upstage, the mixture prior to application to a laminating substrate, particularly if the mixture will be stored prior to use. Suitable heat treatment involves subjecting the monomer mixture to an elevated temperature for a time sufficient to cause sufficient reaction and viscosity increase to inhibit crystallization of the monomers from the mixture upon storage, but not sufficient to gel the composition.

EXAMPLE 1

This example illustrates the preparation of a cured composition according to the invention. Into a glass beaker were weighed 230.90 grams of 4,4'-bismaleimidodiphenylmethane, 38.90 grams of 2,4-bismaleimidotoluene, 36.90 grams of 1,3-bismaleimidobenzene, and 0.9283 grams of phenothiazine (added as an inhibitor to prevent radical polymerization of the bismaleimides on heating). (This mixture was used instead of a single bismaleimide resin for ease of processing, in order to hinder the bismaleimide from crystallizing from its molten mixture with the other components.) The mixture was heated in an oil bath to 205° C., stirred until homogeneous, and allowed to cool to room temperature, solidifying to an amorphous mass. The mass was then broken up into small pieces. The bismaleimide mixture, a slightly upstaged bisphenol A dicyanate resin (HiTek AroCy B-30), and two different bisbenzocyclobutene resins (4,4'-(1,3-phenylenedioxy)bisbenzocyclobutene and 4,4'-(1,3-phenylene)bisbenzocyclobutene) were weighed into each of four beakers in the quantities shown in Table 1.

TABLE 1

| | Mixture # | | | |
|---|---|---|---|---|
| | 1 | 2 | 3 | 4 |
| AroCy B-30, g | 1.0078 | 0.5068 | 1.0082 | 0.5089 |
| Bismaleimide mixture, g | 0.5038 | 0.4986 | 0.5029 | 0.5064 |
| 4,4'-(1,3-phenylenedioxy) bisbenzocyclobutene, g | 0.4765 | 0.4791 | | |
| 4,4'-(1,3-phenylene) bisbenzocyclobutene, g | | | 0.4273 | 0.4245 |

The beakers were heated in an oil bath at approximately 160° C. with stirring until the contents were homogeneous. The mixtures were then poured into molds formed from two sheets of glass separated by a 1/16" (1.6 mm) polytetrafluoroethylene spacer and held together by clamps. The molds were placed into an oven and the mixtures were cured for 3 hours at 210° C., 15 min. at 230° C., 15 min. at 250° C., 15 min. at 270° C., and 1 hour at 290° C. The molds were allowed to cool and the cured resin castings were removed from the molds. A sliver could be cut from the castings with a pair of scissors, indicating toughness; this is not true of standard thermoset resin systems. A similar casting was made with unmodified AroCy B-30 and cured by the same cure schedule. A sliver could not be cut from this casting with a pair of scissors; rather, it chipped like a standard brittle thermoset casting.

EXAMPLE 2

This example illustrates the preparation of a cured composition according to the invention. Preparation of 4-benzocyclobutenylmethyl-capped sulfone oligomer:

A dihydroxyl-terminated polysulfone oligomer having an average degree of polymerization of about 6 was prepared from bisphenol-A and 4,4'-dichlorodiphenylsulfone according to the procedure of Chiang and Ng in *Polymer* 22, p. 3 (1981). To a solution of 90 g of the hydroxyl-terminated oligomer and 11.7 g of 4-chloromethylbenzocyclobutene in 500 ml of chlorobenzene were added 13.6 g of NaOH and 2 g of tetra-n-butyl ammonium bisulfate in 30 ml of water. The mixture was heated with stirring at 80° C. for 20 hours. The cooled organic layer was added to a blender containing isopropanol. The precipitate was washed twice with water in a blender, dissolved in tetrahydrofuran, reprecipitated from isopropanol and dried in vacuo at 100° C. to give 95 g of an off-white product. GPC and $^1$H NMR analysis showed the product to have a number average molecular weight of about 3100. Preparation of 4-benzocyclobutenylmethyl-capped bisphenol-A resin:

To a solution of bisphenol-A (2.26 g, 9.9 mmol), sodium hydroxide (3.96 g, 99 mmol) and tetra-n-butyl ammonium bisulfate (0.61 g, 1.8 mmol) in 30 ml of water at 65° C. was added a solution of 4-chloromethylbenzocyclobutene (3 g, 19.8 mmol) in 30 ml of toluene.

After heating at 65° C. for 7 hrs, the mixture was extracted with diethyl ether. The ether extract was washed with water and dilute sodium bicarbonate, dried over magnesium sulfate, and evaporated under reduced pressure to give 4.55 g of resin.

Test compositions were prepared by melt-blending the components as shown in Table 2. Mitsubishi Gas BT-2100 is a mixture of 90 weight percent dicyanate of BPA and 10 weight percent bismaleimide of methylene dianiline. The BMI was the bismaleimide of methylene dianiline from Aldrich Chemicals. Castings ⅛" in thickness were prepared by curing the blend between glass plates at 200° C. for 2 hours and 220° C. for 6 hours. Test results are shown in Table 2.

TABLE 2

| Material (phr) | Tensile Modulus (KSI) | Tensile Strength (PSI) | Tensile Elong. (%) | Kq (PSI · in) | Tg (°C.) |
|---|---|---|---|---|---|
| BT-2100 | 503 | 5,660 | 1.2 | 531 | 366 |
| BT-2100(52) BMI(16) Benzocyclobutene-capped BPA(32) | 492 | 9,710 | 2.3 | 717 | 220,253 |
| BT-2100(50) Benzocyclobutene-capped Sulfone oligomer(50) | 672 | 13,800 | 4.2 | 1,577 | 197,279 |

We claim:

1. A curable composition comprising:
   (a) a difunctional bisimide of an unsaturated dicarboxylic acid;
   (b) from about 0.5 to about 2 moles, per mole of the difunctional bisimide, of a bisbenzocyclobutene; and
   (c) from about 0.1 to about 10 moles, per mole of the bisimide, of a dicyanate ester.

2. The composition of claim 1 in which the dicyanate ester is represented by the formula

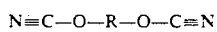

in which R is an aromatic group-containing divalent linking moiety.

3. The composition of claim 2 in which the bisimide is a bismaleimide.

4. The composition of claim 1 which further comprises from about 0.002 to about 0.02 moles, per mole of the bisimide, of a free radical polymerization inhibitor.

5. The composition of claim 3 in which the dicyanate ester is represented by the formula

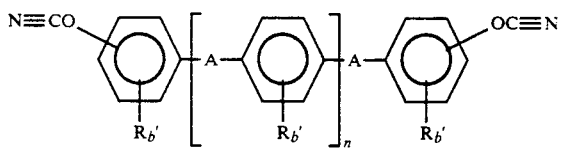

in which each R' is independently selected from $C_{1-6}$ alkyl, allyl, alkoxy or halide; A is a divalent linking group; n is a number within the range of 0 to about 8; and b is 0, 1, 2 or 3.

6. The composition of claim 3 in which the bisbenzocyclobutene is represented by the formula

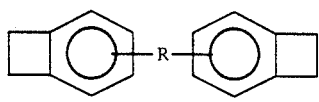

in which R is a direct bond or R is a divalent linking group.

7. The composition of claim 4 in which the free radical polymerization inhibitor is phenothiazine.

8. A composition comprising the polymeric product of contacting, at a temperature of at least about 180° C.,
   (a) a difunctional bisimide of an unsaturated dicarboxylic acid;
   (b) from about 0.5 to about 2 moles, per mole of the bisimide, of a bisbenzocyclobutene; and
   (c) from about 0.1 to about 10 moles, per mole of the bisimide, of a dicyanate ester.

* * * * *